Patented May 16, 1944

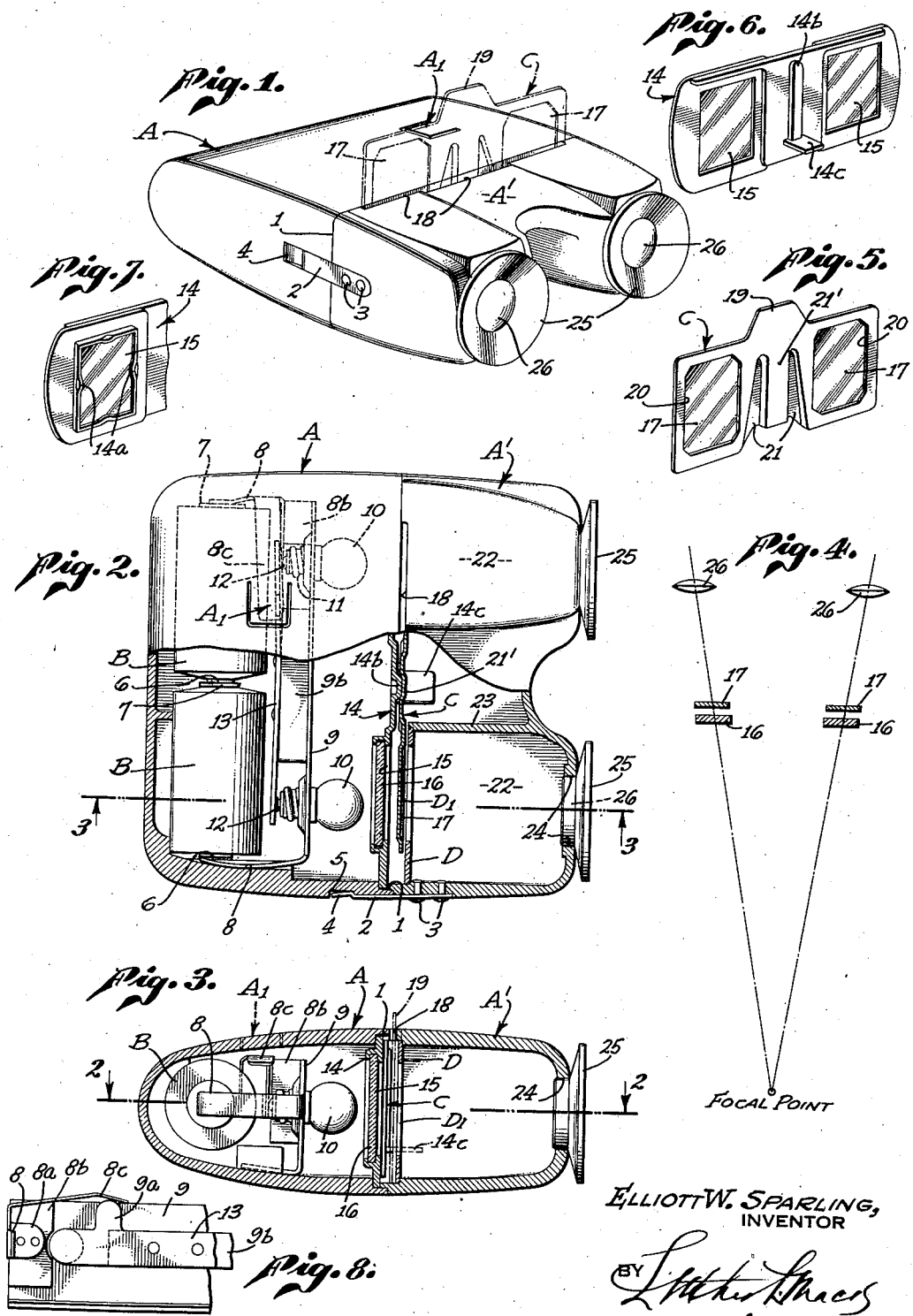

2,349,013

UNITED STATES PATENT OFFICE 2,349,013

STEREOSCOPIC VIEWER

Elliott W. Sparling, Los Angeles, Calif., assignor, by mesne assignments, to Milton Schwarzwald, Los Angeles, Calif.

Application July 23, 1941, Serial No. 403,690

5 Claims. (Cl. 88—29)

This invention relates to and has for an object the provision of an improved stereoscopic viewer by means of which ocularly spaced pictures and images may be viewed in the third dimension with clearness, sharpness of detail and faithfulness which is not possible with ordinary stereoscopes and stereoscopic pictures.

This invention comprehends the provision of a stereoscope constructed of modern materials, for use with an improved and extremely economical slide carrying the pictures to be viewed and accurately designed to present the pictures in ocularly spaced relation before the eyes of a viewer so that when the lenses of the stereoscope are properly positioned before the eyes the pictures on the slide will, contrary to usual practice, due to the spacing of the lenses from the pictures, be on the focal angle of the eyes rather than axially alined with the pictures.

Another object is to provide a simple, economical and modern case or body formed of plastic material and housing electric batteries and lights for illuminating the pictures which are carried on a transparent slide and preferably in color, so as to provide a maximum effect. My apparatus is especially designed for viewing positives produced by modern color photography but may be also used for viewing other pictures of transparent or translucent character which are produced by other methods.

Other objects may appear as the description progresses.

I have shown a preferred form of apparatus in the accompanying drawing which may be more or less modified to meet varying conditions of use within the scope of the claims, in which:

Fig. 1 is a perspective view of an assembled viewer embodying my invention;

Fig. 2 is a top plan view of the same partly in section on line 2—2 of Fig. 3;

Fig. 3 is a sectional elevation of the viewer on line 3—3 of Fig. 2;

Fig. 4 is a diagram showing the ocularly spaced and arranged lenses constituting a prime feature of my invention;

Fig. 5 is a perspective view of a picture slide particularly adapted for use in my improved viewer;

Fig. 6 is a perspective view of a light diffusing element, as seen from the front and adapted to be positioned between a source of light and the pictures;

Fig. 7 is a fragmentary perspective view of the diffusing means as seen from the rear; and Fig. 8 is a fragmentary elevation of a contact unit for regulating the direction of light to the pictures.

Briefly described, my apparatus includes: a case or body preferably composed of a pair of mating members A and A' having a rabbeted joint 1 and adapted to be separably held together for use as by means of one or more spring clips 2 attached to one of the members A or A' by rivets or screws 3 and having their free ends 4 bent to form hooks which seat in notches 5 of the other case member and thus serve to hold the two case members together.

Member A, the rear member as shown, is arranged to support one or more electric batteries B in electrical contact at their inner terminals 6 and 7 (if more than one battery is used). and their outer terminals 6 and 7 in contact with spring contact portions 8 extended from the extremities of a bar 9 which serves to support a pair of lamps 10 held in sockets 11. Said lamps are connected through their sockets 11 with one side of the battery circuit by means of bar 9 while their terminals 12 are commonly connected with a bar 13, so that the lamps and battery cells are thus connected in series. One of the terminals 8 is attached at a foot 8a to an insulating block 8b which, in turn is attached to bar 9 and such terminal 8 has a spring contact 8c formed so as to overlie a lug 9a on bar 9. The top of case member A has a cut out switch portion A1 formed above contact 8c and adapted when depressed to engage contact 8c and to move the same into electric contact with the end of lug 9a so as to complete the circuit of lamps 10. Bar 13 is mounted on bar 9 with an insulating block 9b between said bars.

Held between the case members A and A' at the joint 1 thereof I provide a light diffusing member including a frame 14 which is suitably arranged with ocularly spaced apertures 15 behind which is held in said frame a pair of opalite glass discs 16 disposed forwardly of the lamps 10 for diffusing light therefrom upon light transmitting pictures 17 carried by a slide C. The discs 16 are held in frame 14 by deforming portions of the frame, as at 14a on the rear side of the frame. The top of the case adjacent the joint 1 is formed with a transverse slot 18 through which the slide C is inserted in the case to viewing position and removed, as by means of a tab 19 formed on the upper margin of the slide, as shown in Figs. 1 and 5. It may be noted that slide C is formed of a thin flexible light transmitting material, preferably of Celluloid or plastic and the pictures are adapted to be held therein in depressed areas while the slide is reinforced against undue flexure by suitable ribs at 21. The form of the slide receiving slot 18 corresponds to the cross section of the slides so that a minimum of light will be admitted through the slot when a slide is positioned for viewing purposes. Moreover slides to which this particular form of viewer are not adapted may not be used and accordingly the usefulness and efficiency of the apparatus will not be impaired.

The front section A' of the case has two separately shielded viewing compartments separated by walls as at 23 which are provided with ocularly spaced apertures 24 into which are fitted and in which are held eye pieces 25 carrying magnifying lenses 26. Said lenses 26 are ocularly spaced to correspond to the normal spacing of the eyes while the opalite glasses 15 and pictures 17 are spaced apart transversely of the case at a lesser distance, as shown in Fig. 4, to correspond to the focal angle of the normal eyes and depending upon the axial distance between the lenses 26 and the pictures 17, thus preventing distortion, excess strain on the eyes when using the viewer and providing a maximum of fidelity in the pictures viewed.

The form of slot 18 and the abutting edges of the case member A' and frame 14 correspond to the cross sectional form of the slide B whereby the slide is closely held in viewing position and a minimum of light is admitted through said slot, thereby confining the light from lamps 10 within the case and rendering the pictures 17 clearly and sharply visible. Frame 14 is removably held in position by the case members A and A' when said case members are locked together in operative position by means of the latches 2.

The front side of frame 14 has a vertical rib 14b which conforms to and is adapted to slidably receive the rear channelled side of a rib 21' on slide C and is also provided at the bottom of the rib 14b with a projecting tab 14c which affords a means of removing the frame 14 when the case section A' is detached from section A.

When the case is open, it will be apparent that after the removal of frame 14 the lamps 10, bars 9 and 13 and batteries B may be removed as a unit for any purpose.

As shown in Figs. 2 and 3 a mask D may be held in the front section A' of the case and provided with an opening D₁ through which opening the pictures 17 are viewed. Other modifications of the form of the several cooperating elements of the viewer may be made as necessity may require.

What I claim, is:

1. A stereoscopic viewer comprising: a case having separable front and back members, ocularly spaced eye pieces carried by the front member, a light diffusing member supported on the case at the junction of and held in position by the engagement of said separable members and having ocularly spaced light transmitting elements held thereon, illuminating means wholly supported in the back member, said case having a transverse aperture in the top thereof formed at the junction of said separable members through which a dual picture slide may be inserted and removed from operative position with respect to said light transmitting elements and said eye pieces.

2. A stereoscopic viewer as characterized in claim 1 and including: means formed on said light diffusing member and engageable with complementary means formed on said slide for guiding the slide into and for holding the same in viewing position.

3. A stereoscopic viewer as characterized in claim 1 wherein said light diffusing member is provided with a vertical rib intermediate the light transmitting elements for engagement with a complementary groove on the slide, so that when the slide is inserted in the case the pictures thereon will be focally alined with the light transmitting elements and the eye pieces.

4. A stereoscopic viewer comprising: a case having a pair of separable members, one of said members having a pair of ocularly spaced eye pieces thereon, the other case member having a pair of lamps mounted therein, a light diffusing member removably supported in said case in a transverse plane intermediate the lamps and the eye pieces and arranged with light transmitting elements focally alined with the eye pieces, and means on adjacent margins of the case members for engagement with opposite sides of the diffusing member for holding the diffusing member in operative position when the case members are attached together, said case having an aperture through which a slide may be inserted and removed from viewing position adjacent the diffusing member.

5. A stereoscopic viewer as characterized in claim 4 including means on the diffusing member engageable with a portion of the slide for alining the pictures of the slide with the eye pieces and the light transmitting elements of the diffusing member.

ELLIOTT W. SPARLING.